United States Patent [19]

Ross et al.

[11] Patent Number: 4,732,421
[45] Date of Patent: Mar. 22, 1988

[54] SELF-STORING, RETRACTABLE AUTOMOBILE COVER

[76] Inventors: Richard E. Ross, 1026 Oak Grove Rd., Concord, Calif. 94518; Donald R. Harvey, P.O. Box 399, Benicia, Calif. 94510

[21] Appl. No.: 924,754

[22] Filed: Oct. 30, 1986

[51] Int. Cl.$^4$ .................................................. B60J 7/20
[52] U.S. Cl. ................................... 296/136; 150/53 K
[58] Field of Search ...................... 296/136; 150/52 K; 160/314

[56] References Cited

U.S. PATENT DOCUMENTS

| | | | |
|---|---|---|---|
| 1,567,095 | 12/1925 | Anderson | 160/314 |
| 1,719,055 | 7/1929 | Herzer | 296/136 |
| 1,912,231 | 5/1933 | Wandscheer | 296/136 |
| 1,918,423 | 7/1933 | Perringer | 296/136 |
| 2,751,977 | 6/1956 | Pinkerton | 296/136 |
| 3,222,102 | 12/1965 | Lucas | 296/136 |
| 3,563,594 | 2/1971 | London | 296/98 |
| 3,992,053 | 11/1976 | Hrytzak et al. | 296/136 |
| 4,174,134 | 11/1979 | Mathis | 296/136 |
| 4,324,427 | 4/1982 | Huang et al. | 296/136 |
| 4,432,581 | 3/1984 | Guma | 296/136 |

*Primary Examiner*—Robert R. Song
*Attorney, Agent, or Firm*—Howard Cohen

[57] ABSTRACT

A self-storing, retractable automobile cover apparatus includes a pair of end plates joined in spaced apart disposition by a plurality of rigid tubes. A tubular reel is rotatably secured between the end plates. A pair of cylindrical housings are each secured to one of the end plates, enclosing a constant force spiral spring connected between the respective end plate and the tubular reel. A fabric car cover is adapted to be wound about the tubular reel, with the free end extending between two of the rigid tubes acting as fixed roller guides. Tension applied to the free end of the cover unwinds the cover from the tubular reel while also winding the two spiral springs. The apparatus is removably secured to one bumper of the auto, and the free end of the deployed cover is releasably hooked to the other bumper. When the hooks are released, the spring tension causes the tubular reel to rotate and wind the cover thereabout, the cover passing through the fixed guides to control the takeup of the cover onto the tubular reel.

10 Claims, 9 Drawing Figures

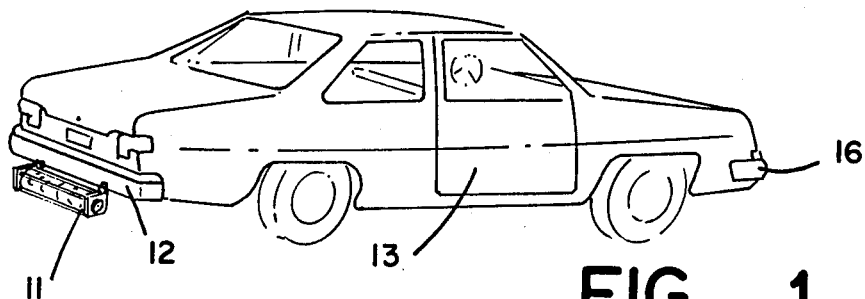
FIG_1
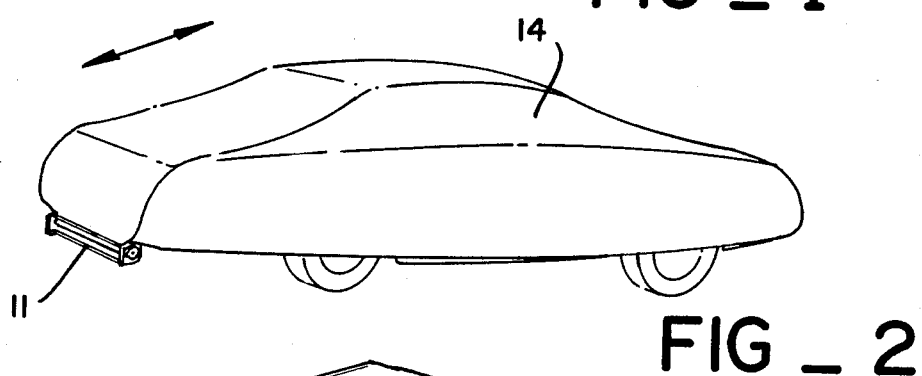
FIG_2
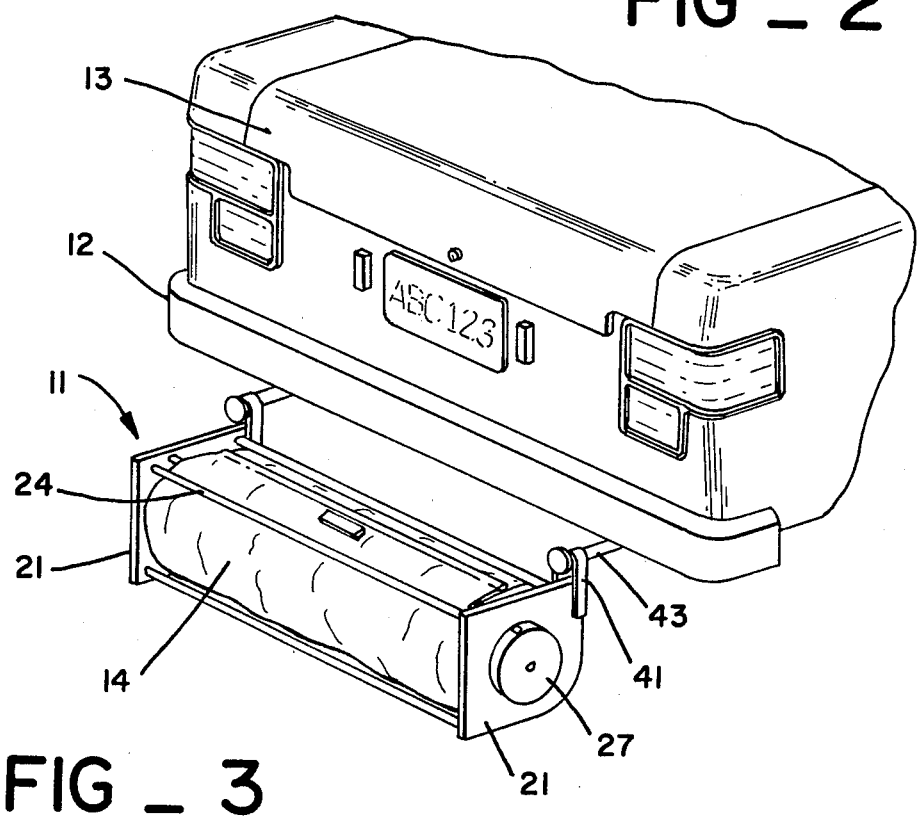
FIG_3

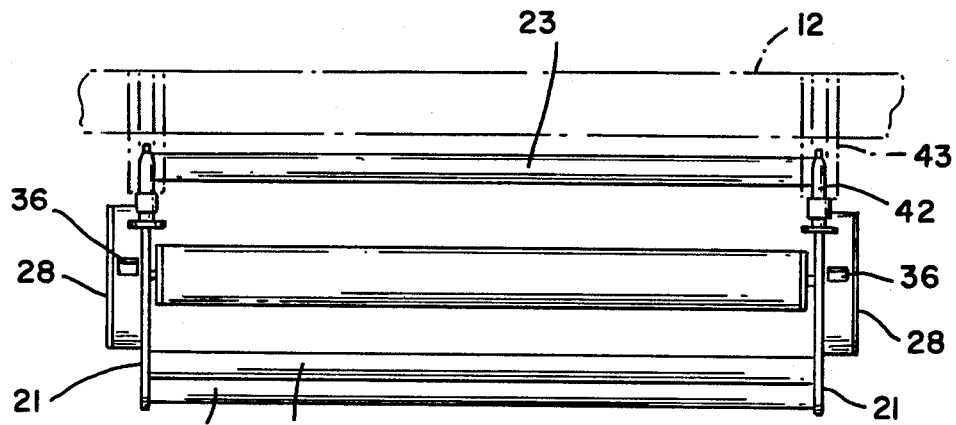
FIG_4
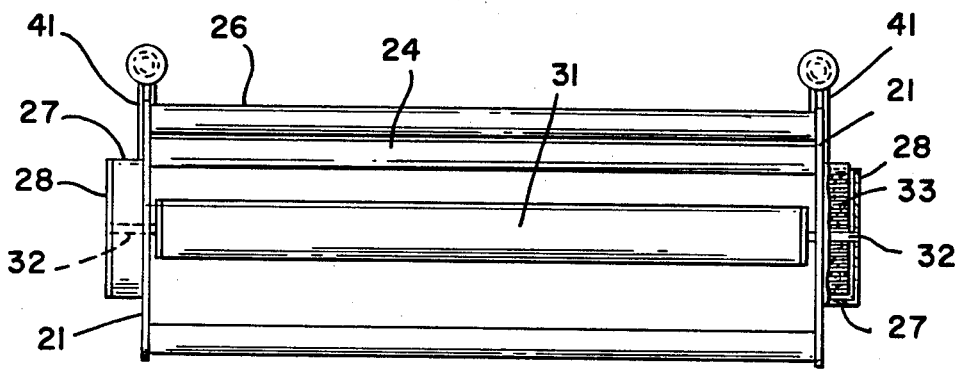
FIG_5
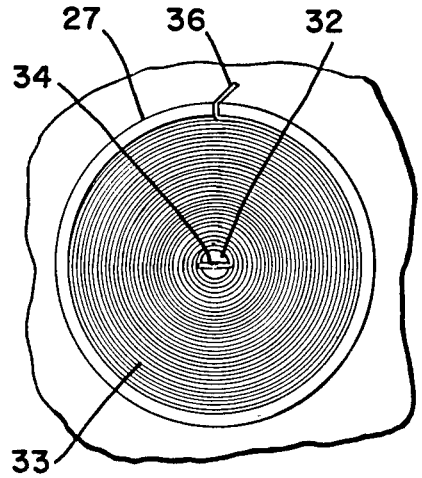
FIG_6
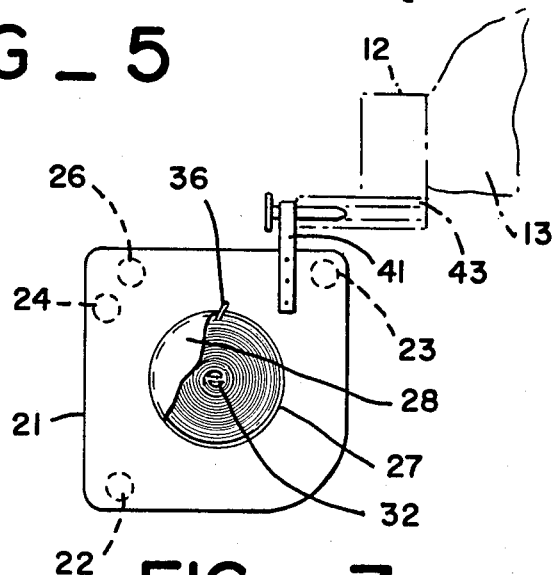
FIG_7

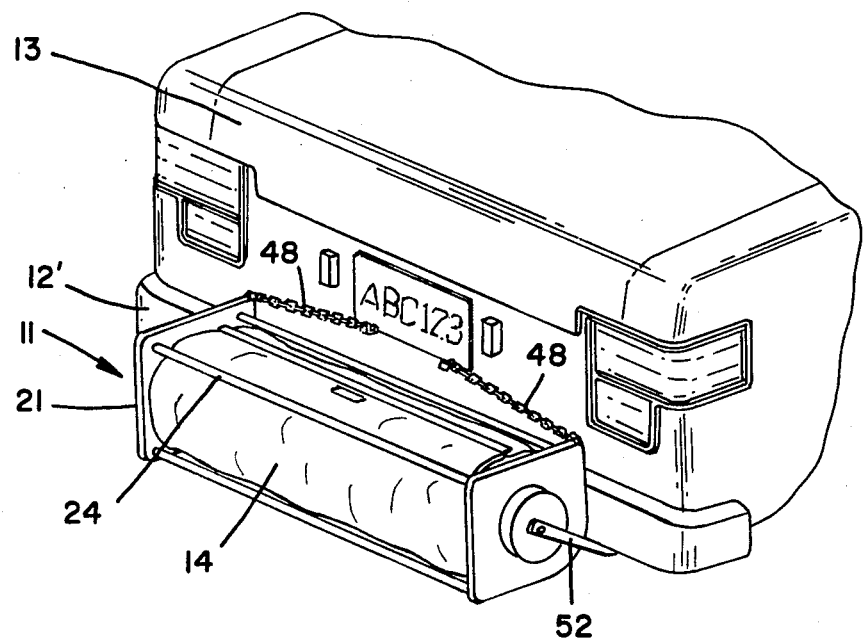
FIG _ 8
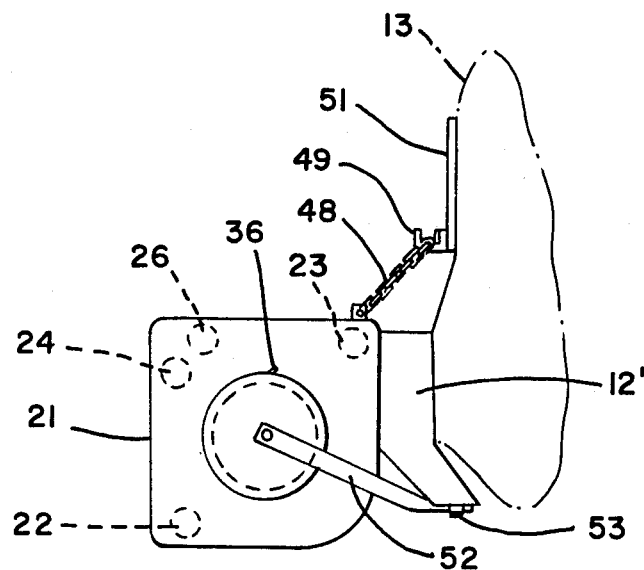
FIG _ 9

SELF-STORING, RETRACTABLE AUTOMOBILE COVER

BACKGROUND OF THE INVENTION

There are many settings and circumstances in which an automobile must be parked or stored without benefit of a protective garage or enclosure. The auto is thus exposed to the elements, and may suffer for the exposure. Dirt, dust, dew, tree sap, bird droppings, ice, and snow may collect on the surface of the auto, rendering cleaning and even driving of the auto problematical. Given the fact that there are more and more autos on the highways, and an insufficient availability of parking garages for those autos, it follows that a great many motorists perceive a need for some convenient form of temporary protection for their vehicles.

There are known in the prior art many forms of temporary car covers, the most common comprising a fabric construction shaped to fit about a generic automobile conformation. Generally, the fabric cover is secured about the body of the automobile by a plurality of hooks or the like which are releasably joined to the lower edge of the body. The cover is generally rolled or folded for storage. Thus, the fabric cover must be unrolled or unfolded for use, arranged over the auto in proper orientation and position, and hooked to the auto. It may be appreciated that the use of a fabric auto cover is laborious and time-consuming, and is therefore inconvenient and disconsonant with modern life.

It is evident that there is a need for an auto cover arrangement that is easily deployed and stored, and that such an arrangement would likely be commercially successful. However, the state of the art leaves much to be desired in terms of convenience and ease of use. The patent literature discloses several forms of self-storing auto covers, usually easily deployable and mechanically or automatically retracted for storage. A significant drawback is that such devices are either incorporated into the body of the auto in permanent fashion, or require permanent installation on some structural portion of the auto. These factors determine that such covers must be installed as original equipment, or require custom installation as a specialty item. In either case, the unmet aftermarket demand, comprising the many autos already on the highway, is not addressed.

SUMMARY OF THE PRESENT INVENTION

The present invention generally comprises a self-storing, retractable automobile cover apparatus which is designed to be convenient to use and quick and easy to operate. It is further adapted to be removably secured to the auto, so that it may be stored within the vehicle when not in use. Thus the invention is designed to be sold as an aftermarket item and used on vehicles now in service, or to be provided with new autos as they are first introduced to the public.

The apparatus of the present invention includes a pair of end plates joined in spaced apart disposition by a plurality of rigid tubes. A tubular reel is secured to a pivot shaft rotatably journalled between the end plates. A pair of cylindrical housings are each secured to one of the end plates, enclosing a constant force spiral spring connected between the respective end plate and the tubular reel. Wound about the tubular reel is a fabric car cover, with the free end extending from the apparatus between two of the rigid tubes acting as fixed roller guides.

The apparatus is removably secured to one bumper of the auto, and the free end of the deployed cover is adapted to be releasably hook- or loop-connected to the other bumper. Tension applied to the free end of the cover unwinds the cover from the tubular reel while also winding the two spiral springs. When the hooks or loops are released, the spring tension causes the tubular reel to rotate and wind the cover thereabout. As the cover passes through the fixed roller guides, the takeup acceleration of the cover onto the tubular reel is attenuated and controlled, and the cover is wound about the tubular reel slowly and with no undue stress applied to the fabric cover. When the cover is fully wound on the tubular reel, the apparatus may be removed from the bumper and placed within the vehicle for storage, or secured to another vehicle for use. The rigid tubes of the apparatus comprise convenient handholds for grasping, handling, and transporting the device.

BRIEF DESCRIPTION OF THE DRAWING

FIG. 1 is a perspective view of the apparatus of the present invention, shown joined to the rear bumper of an automobile with the auto cover retracted.

FIG. 2 is a perspective view as in FIG. 1, shown with the auto cover deployed.

FIG. 3 is an enlarged perspective view of the apparatus of the present invention joined to the bumper of an automobile.

FIG. 4 is a top plan view of the self-storing automobile cover apparatus of the present invention.

FIG. 5 is a rear elevation of the self-storing automobile cover apparatus of the present invention.

FIG. 6 is an enlarged, detailed end view of the spring arrangement of the present invention.

FIG. 7 is a partially cutaway side view of the apparatus of the present invention, shown joined to the bumper of an automobile.

FIG. 8 is a perspective view of a further embodiment for mounting the apparatus of the invention to the rear of an automobile in a high security, anti-theft arrangement.

FIG. 9 is an enlarged detailed side view of the anti-theft mounting arrangement shown in FIG. 8.

DESCRIPTION OF THE PREFERRED EMBODIMENT

The present invention generally comprises a self-storing, self-retracting automobile cover apparatus. With regard to FIG. 1, the apparatus 11 of the invention is adapted to be removably secured to a bumper 12 (either front or rear) of an automobile 13. A fabric car cover 14, many forms of which are known in the prior art, is secured to the apparatus 11 and disposed to be deployed therefrom and drawn over the auto (FIG. 2), and secured to the opposed bumper 16 (rear or front) by devices known in the art, such as hooks, fabric loops, or the like. When the distal end of the fabric cover is released from the the opposed bumper 16, the apparatus automatically retracts the cover 14 and returns it to the confines of the apparatus, as shown in FIG. 3.

With regard to FIGS. 4–7, the apparatus 11 is comprised of a pair of end plates 21 disposed in laterally spaced, parallel disposition, and joined together by a plurality of rigid tubular members 22–26. Although the precise shape of the end plates 21 is not critical, in the preferred embodiment the plates are provided with a generally square configuration with the lower front corner thereof being rounded. The tubular member 23 extends laterally between the upper front corners of the end plates 21, and the tubular member 22 extends between the lower rear corners of the end plates. The tubular members 24 and 26 both extend laterally in closely spaced relationship between upper rear corners of the end plates. The members 24 and 26 not only serve to join the end plates in rigid, spaced apart opposition, they also serve as fixed roller guides for the fabric cover 14, as will be explained in the following description.

The apparatus 11 also includes a pair of cylindrical housings 27, each secured to a medial portion of the outer surface of one of the end plates 21. Each cylindrical housing 27 includes a cylindrical sidewall and an end panel 28 secured to the outer extent of the cylindrical sidewall to define with the end plate 21 a closed cylindrical chamber therebetween. A tubular reel member 31 extends between the end plates 21, the reel member 31 including a pair of pivot shafts 32, each extending axially from one end of the reel member. The end panels 28 and the end plates 21 are provided with axially aligned holes disposed to receive and journal the pivot shafts 32 in freely rotating fashion, so that the reel member 31 may also rotate freely.

Disposed within each cylindrical housing 27 is a spiral wound, constant force spring 33, as shown in FIGS. 5 and 6. Each spring 33 is concentric about the respective pivot shaft 32, and includes an inner end 34 which is adapted to be received through a radial hole in the respective pivot shaft. The distal, outer end of each spring 33 is formed with an integral hook bend 36 which is fixedly received through a slot formed in the cylindrical sidewall of each housing 27. Thus each spring is connected between a respective rotatable shaft 32 and the fixed housing 27. The springs are each from 12 to 20 feet long, and adapted to accommodate 30 to 40 rotations of the shafts 32.

It may be appreciated that the fabric auto cover 14 is adapted to be wound about the tubular reel 31. One end (in the embodiment shown, the rear end) of the auto cover is joined to the surface of the tubular reel by means of a leader panel having one end sewn to the auto cover, the opposite end being secured to the reel by adhesive, adhesive tape, rivets, or the like. The auto cover is fully wrapped about the tubular reel with the springs 33 in the relaxed (unwound) disposition. As the cover is drawn under tension from the reel, the rotation of the shafts 32 winds the springs 33 and creates a restoring torsional force that urges the shafts 32 and reel 31 to counter-rotate and rewind the cover 14 about the reel.

As noted previously, the cover 14 is led between the members 24 and 26 acting as fixed roller guides. The narrow slot opening between the members 24 and 26 is designed to serve several functions. As the cover is rewinding onto the reel 31, the friction created by the roller guides attenuates the linear acceleration of the cover towards the reel, resulting in a smooth and steady takeup of the cover 14. This action alleviates undue stress to the cover, and extends its useful life. Further, due to the fact that the cover 14 is wider than the spacing of the end plates 21, the roller guides act to gather the cover laterally and direct it onto the reel without snagging or bunching.

A salient feature of the present invention is the provision of means for removably securing the apparatus to the automobile, so that it may be removed and stored within the auto when not in use. As shown in FIGS. 3–5 and 7, a pair of rigid links 41 are provided, each extending upwardly from the upper corner portion of each end plate 21. A mounting pin 42 is secured to the upper end of each link 41 and disposed to extend forwardly therefrom. A pair of tubular mounting lugs 43 are fixedly joined to the bumper structure 12 of the automobile by straps, clamps, or similar devices (not shown), as are well known in the prior art. The lugs 43 are spaced apart identically to the spacing of the mounting pins 42, and disposed to receive the pins 42 therein, as shown in FIG. 7, in sliding fit relationship. Although a ball detent or the like may be provided to retain the pins 42 within the lugs 43, it should be noted that use of the apparatus does not exert any force on the assembly 42–43 which would tend to separate the two components.

Due to the fact that the apparatus 11 depends subjacently from the bumper structure of the auto, it is spaced rather close to the roadway and is therefore not well-suited to accommodate driving of the vehicle. Thus, when not in use, the apparatus may be removed from the lugs 43 by simple rearward force applied to the apparatus. The apparatus may then be placed within the automobile, for example the trunk of the auto, and stored therein until required again. The end plates, tubular members, and reel may be formed of ABS plastic or the equivalent, and the overall weight of the apparatus is quite low. Furthermmore, the tubular members 22–24 and 26 comprise excellent handholds for manual grasping and transport of the apparatus.

With regard to FIGS. 8 and 9, a further embodiment of the invention is designed to provide a high security arrangment for removably joining the apparatus of the invention to an automobile to resist theft, vandalism, and the like. The apparatus 11 is substantially the same as described above, with the exception that the links 41 and the pins 42 are not provided on the apparatus, and the mounting lugs 43 are not provided on the automobile. Rather, a pair of chains 48 or the like are each secured in permanent fashion to one of the upper front corner portions of the end plates 21. (The chains may preferably be encased in a flexible plastic sleeve to prevent damage to the automobile finish.) The free ends of the chains 48 are removably secured to a pair of lockable cleats 49 extending from the automobile. In the preferred embodiment, the cleats 49 are threaded into two of the holes typically provided for securing the license plate 51 to the rear of the vehicle. It may be appreciated that when the chains 48 are locked to the cleats 49, the cleats cannot be rotated to effect removal thereof. Lockable cleats are well known in the prior art, typically used in conjunction with motorcycles, boats, and the like, and are readily available to the individual having ordinary skill in the art.

The apparatus 11 is effectively suspended from the cleats 49 by the chains 48. The embodiment further includes a pair of straps 52, each having one end permanently secured to the outer surface of the housing 27. The other ends of the straps are provided with means for being removably secured to the bumper 12' of the automobile 13. These means may comprise hooks to engage the lower edge of the bumper, or may preferably comprise snap fasteners. Of course, complementary snap fasteners are secured to the bumper to facilitate easy joining and removal of the straps to the bumper. It maly be appreciated that the straps do not provide security in addition to the locking cleats and chains, but are provided to resist the upward thrust imparted to the apparatus 11 when the auto cover is pulled from the reel.

We claim:

1. A self-storing, retractable automobile cover apparatus, including; a pair of end members; a plurality of rigid tubes, extending between said end members and rigidly joined thereto to maintain said end members disposed in spaced apart disposition; a tubular reel assembly rotatably secured between said end members; a pair of cylindrical housings, each secured to one of said end members; a pair of constant force spiral springs, each received within one of said housings and connected between the respective end member and the adjacent end of said tubular reel assembly; a fabric auto cover adapted to be wound about said tubular reel assembly, two of said rigid tubes disposed in closely adjacent, parallel opposition, said fabric auto cover having a free end extending between said two rigid tubes as fixed roller guides, means for connecting said springs so that unwinding said cover from said tubular reel assembly drives said tubular reel assembly to wind said pair of spiral springs; and means for removably securing said apparatus to one bumper of the auto.

2. The self-storing, retractable automobile cover apparatus of claim 1, wherein said means for removably securing said apparatus includes a pair of tubular mounting lugs, means for joining said mounting lugs to said bumper, and a pair of mounting pins, each extending from one of said end members and dimensioned to be received in said mounting lugs in sliding fit relationship.

3. The self-storing, retractable automobile cover apparatus of claim 2, wherein at least one of said tubular members is disposed to comprise a handhold for said apparatus.

4. The self-storing, retractable automobile cover apparatus of claim 1, wherein each cylindrical housing includes a cylindrical wall extending from said end member generally coaxially with said tubular reel assembly, and an end panel extending across the distal end of said cylindrical wall.

5. The self-storing, retractable automobile cover apparatus of claim 4, wherein said tubular reel assembly includes a pair of pivot shafts, each extending from one end of said tubular reel assembly in axial orientation.

6. The self-storing, retractable automobile cover apparatus of claim 5, further including aligned journal holes in said end member and said end panel, said journal holes dimensioned to support said pivot shafts in freely rotating fashion.

7. The self-storing, retractable automobile cover apparatus of claim 6, wherein each of said spiral springs is disposed within said cylindrical wall and between respective ones of said end members and said end panels and extending concentrically about one of said pivot shafts.

8. The self-storing, retractable automobile cover apparatus of claim 1, wherein said fixed roller guides are disposed to attenuate acceleration of said auto cover due to torsional restoring force of said springs.

9. A self-storing, retractable automobile cover apparatus, including; rigid frame means, reel means adapted to secure a fabric auto cover wrapped spirally thereabout, means for supporting said reel means on said frame means in freely rotating fashion, means for driving said reel means to rotate and wind said fabric auto cover thereabout, and means for removably securing said apparatus to a bumper portion of an automotive vehicle, including a plurality of chain members permanently joined to said apparatus, and locking cleat means joined to said automotive vehicle and adapted to lockably secure said plurality of chain members.

10. The self-storing, retractable automobile cover apparatus of claim 9, further including a pair of straps, each having one end joined to an opposed end portion of said apparatus, and means for removably securing an opposed end of each strap to a portion of said vehicle subjacent to said locking cleat means.

* * * * *